INVENTORS:
PAUL R. SCOTT
RONALD F. SCHEUERMAN
BY: *Louis J. Bovasso*

THEIR ATTORNEY

United States Patent Office 3,474,596
Patented Oct. 28, 1969

3,474,596
PROCESS FOR TRANSPORTING VISCOUS FLUIDS
Paul R. Scott, Houston, and Ronald F. Scheuerman, Bellaire, Tex., assignors to Shell Oil Company, New York, N.Y., a corporation of Delaware
Filed Jan. 24, 1968, Ser. No. 700,200
Int. Cl. B01d *19/00*
U.S. Cl. 55—45          5 Claims

ABSTRACT OF THE DISCLOSURE

A process for reducing the viscosity of a stream of viscous fluid flowing within a pipeline having constituents which solidify upon cooling. A portion of the stream is diverted and heated to a temperature at which thermal degradation of at least some of the constituents thereof takes place thus lowering its average molecular weight and viscosity. The heated portion is then blended with the remainder of the stream thereby increasing the temperature of the entire stream flowing within the pipeline.

BACKGROUND OF THE INVENTION

Field of the invention

This invention relates to a process for transporting viscous fluids, more particularly, to a process for reducing the viscosity of a stream of viscous fluid flowing in a pipeline having constituents which solidify upon cooling.

Description of the prior art

Vast networks of pipeline, particularly in the southwestern portion of the United States, provide a means for the transmission of petroleum crudes from production areas to refineries or transportation facilities. Similar pipelines also crisscross the other portions of the United States carrying, in addition to petroleum crudes, many other fluids, and in some cases fluid-solid mixtures.

Whether pipelines are used for the transmission of petroleum crudes, other fluids, or fluid-solid mixtures, a major expense in the transmission thereof is the pumping cost. From the following equation, it can be seen that pumping cost in laminar flow will be proportional to the viscosity of the fluid.

$$\Delta P = \frac{32 L V v'}{gD^2}$$

In the Hagen-Poiseuille equation (above):

$\Delta P$ = pressure drop in lbs./sq. ft.
$V$ = velocity in ft./sec.
$L$ = length of pipe in ft.
$v'$ = viscosity in lbs./ft./sec.
$g$ = acceleration of gravity in ft./sec./sec.
$D$ = diameter (inside) in ft.

From a perusal of the above equation it can be seen that the viscosity ($v'$) of the fluid being pumped through the pipeline plays a large role in determining the actual pumping cost. For example, if the viscosity doubles it will require twice the work to maintain a constant throughput. Likewise, it can also be shown that in turbulent flow, the viscosity of the fluid still plays an important role in determining pumping costs.

Since the viscosity of a given fluid is dependent upon the temperature of the fluid, even seasonal changes of temperature at the situs of a pipeline can considerably alter the pumping cost. For example, seasonal temperature change of approximately 25° C. can change the viscosity of No. 5 fuel oil from 87 centipoises at 25° C. to 610 centipoises at 0° C., resulting in a more than double increase in the pumping cost of No. 5 fuel oil at the latter temperature.

In addition, there are some petroleum crudes in the United States, such as certain crudes in the state of Mississippi, which have extremely high viscosity and cannot be moved by pipelines without heating to lessen their viscosity. For example, Baxterville oil has a viscosity of 17,400 Sabolt Universal Seconds (SUS) at 60° F. and a gravity of 16.4 API°, being almost a plastic semisolid. In order to pump such a viscous crude through a large diameter pipeline, a minimum line temperature of 80° F. must be maintained, and pressures as high as 1,000 p.s.i. may be required to achieve useful flow.

One technique to the transmission of viscous crudes, such as described above, is the use of oil heating equipment at pumping stations. Live steam boilers cooperating with heat exchangers can be used to provide the necessary heat to lower the viscosity of these crudes and make crudes like the Baxterville crudes pumpable. Of course, heating to improve pumpability is not limited to the highly viscous crudes above, and such boilers can be used to lower the viscosity of the less viscous crudes to achieve a reduction in pumping costs. Boilers employed in such techniques are usually fueled by natural gas or oil or a combination thereof; and, when working with viscous crudes, standby fuel supplies are a must since a failure of any boiler can be disastrous, allowing the crudes to freeze in the pipeline. A notable example of a steam-heated pipeline is the 152-mile pipeline from Eucutta, Miss., to Mobile, Ala., discussed in World Oil, March 1952, pp. 214–216, in an article entitled, "Steam-Heated Pipeline." The article describes a pipeline using 150 horsepower boilers, spaced at 9-mile intervals to prevent the crude from freezing in the pipeline.

While such oil-heating equipment at pumping stations can provide the necessary heat to lower pumping cost and/or improve the pumpability of highly viscous fluids, they are not very efficient since the heat in the combustion unit cannot be fully transferred to the pipeline fluid. Furthermore, boiler and heat exchange equipment is often expensive, and the costs of operation and maintenance can be considerable, often requiring a licensed operator. Further, the space between two heating units along the pipeline has to be large to minimize the number of units required. Thus, it is necessary that the crude be raised to a rather high temperature at each station in order to retain sufficient heat to reach the next heating unit. Of course, these high temperatures provide a large temperature differential ($\Delta T$) between the pipeline and the local surroundings, resulting in high heat loss and extreme inefficiency.

SUMMARY OF THE INVENTION

It is an object of this invention to reduce the viscosity of a viscous fluid flowing in a pipeline.

It is a further object of this invention to lower the transportation, production and refining costs for processing a viscous fluid by lowering the molecular weight of the viscous fluid.

The objects of this invention are carried out by reducing the viscosity of a stream of a viscous fluid flowing within a pipeline having constituents which solidify upon cooling. A portion of the stream is diverted and heated to a temperature at which thermal degradation of at least some of the constituents of the diverted viscous fluid takes place, thus lowering both the average molecular weight and the viscosity thereof. The heated diverted portion is then blended with the remainder of the stream thereby increasing the temperature of the entire stream of viscous fluid flowing within the pipeline.

DESCRIPTION OF THE PREFERRED EMBODIMENTS

As used hereinafter, the term "viscous fluid" refers to any of the various fluids having constituents which solidify upon cooling and thus can be broken down so as to be more easily transportable. For example, the process of this invention is particularly applicable, but not limited, to waxy petroleum fluids and will be described accordingly.

Figure 1:
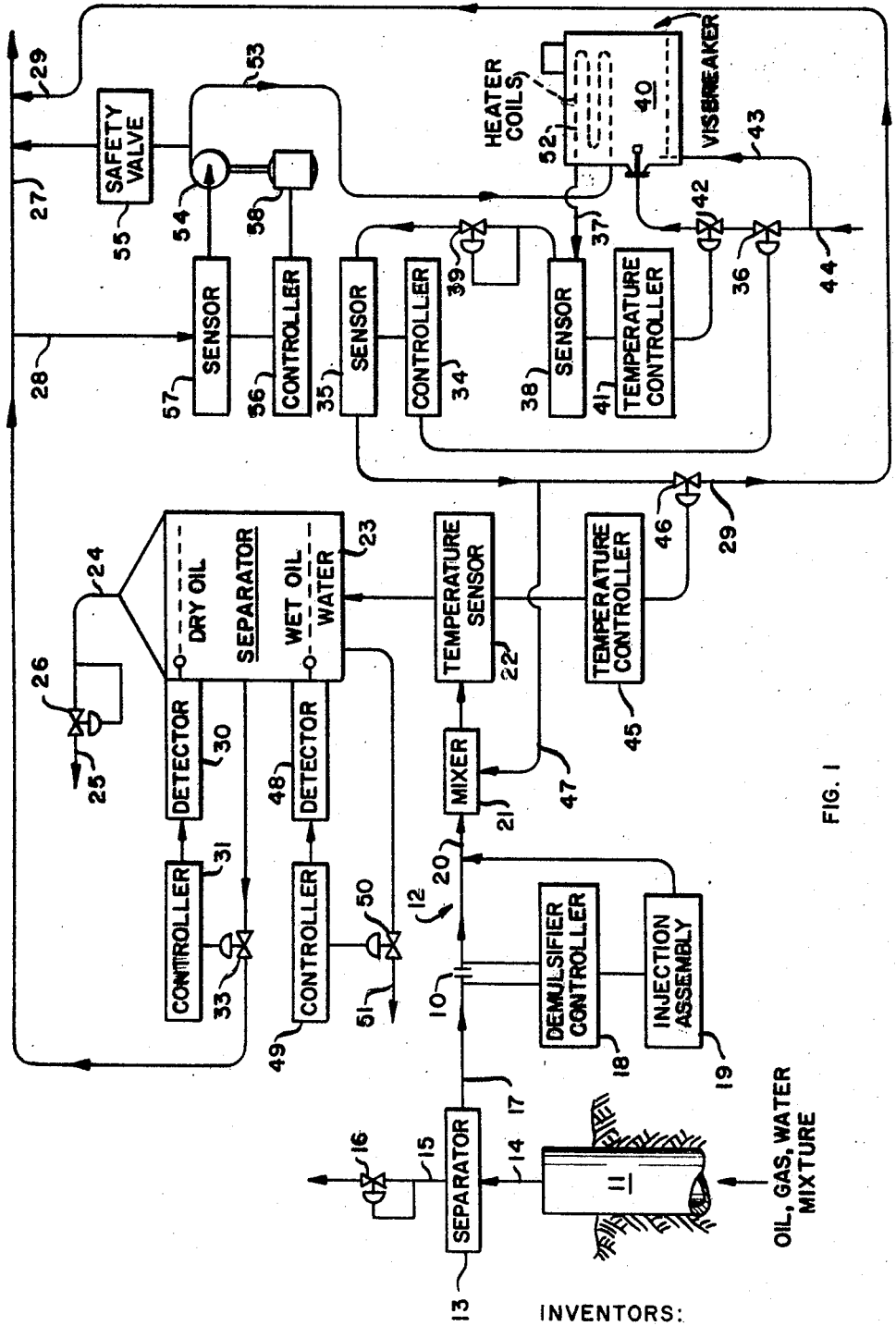
FIGURE 1 shows a flow scheme of a process for dehydrating crude oil from a production well.

Referring to the crude oil dehydration process of FIGURE 1, the tubing 11 of a production well is shown for introducing a mixture of oil, gas and water into system 12. A conventional gas separator 13 communicates with the production line 14 from tubing 11. Gas vapors from separator 13 are removed through vapor outlet 15; a conventional gas-back pressure valve 16 engages outlet 15 so as to maintain the desired pressure in separator 13, if desired. Oil is flowed from separator 13 through wet oil outlet 17 and through orifice meter plate 10 of a conventional proportioning demulsifier controller 18. Controller 18 and injection assembly 19 may be required to add chemical demulsifying agents to the oil-water mixture flowing in system 12 for converting the mixture to a form that resists emulsification as is well known in the art. From there, the oil-water mixture flows through wet-oil line 20 to a hot-cold crude mixture 21 and temperature sensor 22. From sensor 22, the wet-oil mixture flows into a conventional crude oil-water separator 23 where the mixture separates into water, dry oil and wet oil phases as illustrated in FIGURE 1 and as is well known in the art. Gas vapors are removed through vapor outlet 24 to a storage area 25. If desired, a gas-back pressure valve 26 may be coupled to vapor outlet 24 so as to maintain the desired pressure in separator 23.

Hot separated oil is removed from separator 23 through oil outlet line 27 to a storage area (not shown). Hot oil bypass 29 may engage outlet 27 for feeding excess visbroken oil into the storage area.

Preferably, a conventional gas-oil interface detector 30 is associated with the gas-oil interface in separator 23 as shown in FIGURE 1. A conventional oil level controller 31 is coupled to detector 30. A control valve 33 couples controller 31 to oil outlet 27.

Low flow sensor 35 is coupled to a low flow gas shut-off controller 34 which is in turn coupled to a gas shut-off valve 36. Sensor 35 is, in turn, coupled to both a hot oil bypass 29 and a temperature sensor 38. A back pressure control valve 39 is disposed between flow sensor 35 and temperature visbroken oil discharge line 37 which is in communication with sensor 38 to maintain the prefered pressure on the fluid in the heating coils 52. Sensor 38 is coupled to the heating coils 52 of a cracking furnace or visbreaker 40. A temperator controller 41 is coupled to both sensor 38 and a gas control valve 42 for visbreaker 40. A pilot light 43 for the gas supply is preferably coupled to visbreaker 40 and a gas supply inlet 4 leading from a conventional gas supply source (not shown).

A temperature controller 45 is coupled between sensor 22 and a temperature controller valve 46. A mixer inlet line 47 couples bypass 29 to mixer 21.

A conventional water-oil interface detector 48 is used to detect the level of the interface between the oil and water in separator 23. A water level controller 49 couples detector 48 to a valve 50 which controls water outlet 51 from separator 23.

An outlet 53 from visbreaker 40 is coupled to both a supply pump 54 for charging visbreaker 40 and a safety valve 55 which is coupled to oil outlet line 27. Pump 54 is driven by any conventional motive means, such as a motor 58 which is, in turn, coupled to controller 56. Supply pump 54 is coupled to a low flow sensor 57 which is, in turn, coupled to oil outlet line 27 through oil bypass line 28.

In operation, a gas-oil-water mixture from a production well is flowed from tubing 11 through production line 14 into separator 13 where the vapor pressure of the mixture is reduced and any undissolved gas is removed through gas outlet 15 and pressure valve 16 as is well known in the art.

The oil-water mixture is then passed from separator 13 through outlet 17 then through orifice meter 10 and into wet oil line 20 where chemical demulsifying agents may be aded to the mixture, if required, by means of the demulsifying controller 18 and proportioning and injection assembly 19 as is well known in the art.

The oil-water mixture is next passed from wet oil line 20 to a mixer 21 where the water-oil mixture (i.e., the wet crude oil) is mixed with hot crude oil from visbreaker 40 as will be described further hereinbelow. This mixture of the hot crude oil heats the entire crude oil stream to the desired temperature which is then passed into temperature sensor 22 and water separator 23. In separator 23, dissolved gas vapors are separated through vapor outlet 24 which is controlled by valve 26 and leads to a storage area 25. As illustrated in FIGURE 1, the water is removed from separator 23 through water outlet 51 which is controlled by valve 50. A conventional controller 49 and detector 48, operatively engaging valve 50, cooperates with the water level in separator 23 to control the level of the water therein; in like manner, a conventional controller 31 and detector 30, operatively engaging valve 33, controls the oil level in separator 23 as is well known in the art.

Oil is removed from separator 23 through oil outlet line 27 which is controlled by valve 33 and leading to a storage area (not shown). A bypass 29 operatively engages line 27 for introducing excess heated oil back into line 27.

A portion of the dry oil is passed from separator 23 through oil-bypass line 28 to low flow sensor 57 which is in communication with pump controler 56. From there, the dry oil is passed to supply pump 54 which is driven by motor 58 and is controlled by controller 56.

From supply pump 54, the dry oil is passed through outlet 53 and into the coils 52 of visbreaker 40 where the dry oil is heated to the desired temperature. A safety valve 55 may be disposed between outlet 27 and outlet 53, if desired. The necessary gas for heating visbreaker 40 may be introduced from a source (not shown) through supply inlet 44 and into visbreaker 40. A pilot light 43 is preferably disposed between inlet 44 and visbreaker 40 as can be seen in FIGURE 1.

The heated oil is passed from the coils 52 of visbreaker 40 through sensor 38, control valve 39, sensor 35 and into mixer inlet line 47. The desired quantity of hot oil is diverted from bypass line 29 through mixer inlet line 47 and into mixer 21 to raise the temperature of the wet oil-visbroken oil blend to a desired operating temperature for separator 23.

The temperature controller 45 controls valve 46 and operatively engages both sensor 22 and bypass line 29 for controlling the temperature of the wet crude oil going into separator 23 as is well known in the art. Temperature controller 41 controls valve 42 and is disposed between temperature sensor 38 and gas supply inlet 44 for controlling the temperature of visbreaker 40. Gas supply controller 34 controls gas shut-off valve 36 and is disposed between gas supply inlet 44 and flow sensor 35.

Figure 2:
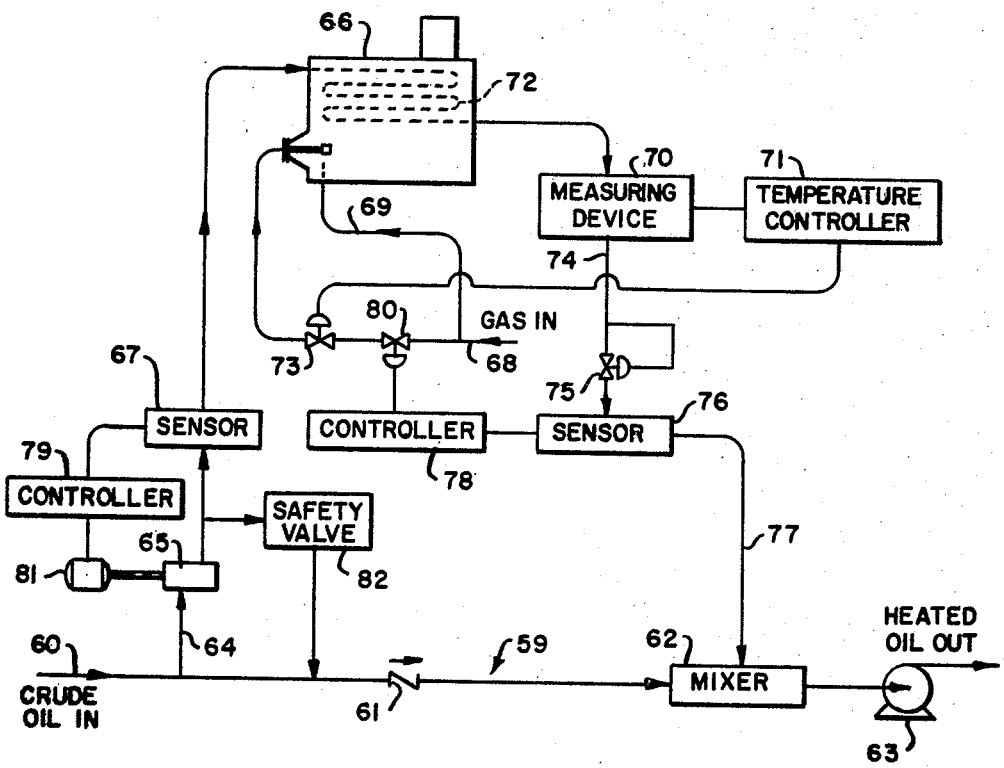
FIGURE 2 shows a flow scheme of a process for lowering the viscosity of oil flowing in a crude oil pipeline.

In addition to the crude oil dehydration process of FIGURE 1, the viscosity of oil flowing in a crude oil pipeline may be lowered as illustrated in the system of FIGURE 2. Referring to FIGURE 2, cold crude oil from either a storage area or a previous station (not shown) is passed into system 59 through oil inlet line 60. The main stream of cold crude oil passes from line 60 through a conventional check valve 61 and into a mixer 62.

In mixer 62, the cold crude oil mixes with the hot visbroken crude as will be explained further hereinbelow. The heated oil mixture passes through main pump 63 to the end of the pipeline or the next station (not shown).

A cold oil inlet line portion 64 branches off of oil inlet line 60 and passes into a charger pump 65 for a cracking furnace or visbreaker 66. A safety valve 82 may be installed as illustrated in FIGURE 2, if desired. A flow sensing device 67 is disposed between pump 65 and visbreaker 66. Gas for operating visbreaker 66 is provided from a gas supply (not shown) through gas supply line 68 leading to visbreaker 66. A pilot light gas supply 69 is disposed between visbreaker 66 and line 68. A conventional temperature measuring device 70 and temperature controller 71 is disposed between the heating coils 72 of visbreaker 66 and a temperature control valve 73 operatively engaging gas supply line 68.

A hot oil outlet line 74, controlled by a back pressure valve 75, leading from measuring device 70 passes through a low oil flow sensing device 76. From device 76, a hot oil line 77 feeds into mixer 62. Sensing device 76 is also coupled to a low oil flow controller 78 connected to a gas shut-off valve 80 disposed between controller 78 and gas supply line 68.

In operation, a portion of the cold crude oil, from either the storage area or a previous station, is flowed into system 59 through oil inlet line 60. A portion of the cold crude oil is drawn off from line 60 and passed through line portion 64 to pump 65. Meanwhile, the remainder of the cold crude oil is passed through check valve 61 and into mixer 62 where it meets the hot visbroken crude oil coming from the coils 72 of visbreaker 66 as will be explained further hereinbelow.

The cold crude oil passed into pump 65 driven by pump drive 81 is pumped through the heating coils 72 of visbreaker 66. This hot, visbroken oil is then passed through measuring device 70, oil outlet line 74 which is controlled by valve 75, low oil flow sensing device 76 and into oil line 77. From line 77, the hot oil flows to mixer 62 where it is blended with the cold crude oil. This mixing is carried out on the suction side of the main pump 63 and the mixture of the cold crude oil with the hot crude oil brings the entire oil stream to its desired temperature. The resulting mixture is then passed to pump 63 and out to the end of the pipeline or the next pumping and heating station (not shown).

Gas for firing visbreaker 66 is supplied through line 68 from a source (not shown) and into the visbreaker 66. Temperature controller 71 controls valve 73 and is coupled to measuring device 70 for controlling the temperature of the visbreaker 66. Low oil flow controller 78 is coupled to sensing device 76 and controls gas shut-off valve 80 coupled to gas supply line 68. Controller 79 is coupled to sensing device 67 and pump drive 81 and controls the fluid flowing through visbreaker 66 as is well known in the art.

Although preferred systems of conventional controllers, sensors, valves, etc., has been set forth hereinabove, it is to be understood that various types and arrangements thereof may be provided within the scope of invention.

Heating is thus the preferred method disclosed herein for removing water from and reducing the viscosity of a viscous fluid, such as a waxy petroleum fluid, flowing within a pipeline. The systems disclosed hereinabove propose that, rather than heating all of the oil to a desired temperature, only a portion of the oil is heated to a temperature significantly higher than the final desired temperature. A portion of the oil is heated sufficiently hot, as, for example, 800° to 1000° F., so as to cause thermal degradation of some of the constituents in the oil which solidify upon cooling. This lowers the average molecular weight of the oil, thereby lowering its viscosity. The hot stream of "visbroken" oil is then blended with the remainder of the oil, thus increasing the temperature of the oil in the entire system to the desired temperature. The portion of the oil subjected to the visbreaking treatment and the visbreaking temperature is dependent upon the properties of the oil and the desired final oil temperature.

Heating costs are thus not appreciably higher than the cost required to heat all of the oil to the desired line temperature. A greater viscosity reduction is attained at the same final temperature than when all the oil is heated because the average molecular weight of the visbroken oil is lower. This lower average molecular weight facilitates the "start up" of wax-containing systems.

The process of this invention results in overall benefits in the entire system of processing viscous fluids. For example, the visbreaking may be done in the field, thus lowering refining costs. The lower volatile loss plus the addition of the lower molecular weight material from the visbreaking results in a net lowering of the viscosity of the material to be transported by pipeline, thus lowering transportation costs per barrel. Reducing the viscosity of a portion of the oil by visbreaking results in lower water separator temperatures, thus lowering volatile losses and chemical costs. The final result is more barrels of production oil at lower costs per barrel.

Operating conditions for a typical visbreaker in accordance with both the foregoing preferred processes of the invention with respect to a crude oil may be as follows.

Crude oils: API gravity at 60° F.=14 to 24,
Operating temperature, 0° F.= 850 to 900[1],
System pressure, p.s.i.g.=200 to 400[2],
Space velocity, lbs./hr./ft.$^3$ volume of coils=1000 [3] to 1500.

The following table shows two visbreaking test runs on asphaltic and waxing crudes in accordance with the teachings of this invention.

TABLE 1.—VISBREAKING OF ASPHALTIC AND WAXY CRUDES

| | 14° API Asphaltic | 29° API Waxy |
|---|---|---|
| Visbreaking Conditions: | | |
| Temperature, ° F. | 860 | 870 |
| Cool velocity, lbs./hr./ft.$^3$ volume | 1,340 | 1,090 |
| Residence time, sec. | 118 | 124 |
| Recovery, percent | 99.1 | 99.1 |
| Yields, No Loss Basis: | | |
| Gas: | | |
| Percent weight | 1.6 | 0.8 |
| S.c.f./100 lbs. product | 20.1 | 12.6 |
| Total liquid product, percent weight | 98.4 | 99.2 |
| Gas Composition, percent weight of Gas: | | |
| Hydrogen | 0.4 | 0.7 |
| Methane | 17.6 | 30.1 |
| Ethylene | 1.3 | 4.1 |
| Ethane | 13.7 | 19.6 |
| Propylene | 6.9 | 10.2 |
| Propane | 17.8 | 17.1 |
| Butylenes | 8.8 | 5.2 |
| Isobutane | 3.4 | 1.8 |
| n-Butane | 8.9 | 5.1 |
| Amylenes | 4.0 | 1.3 |
| Isopentane | 3.2 | 1.0 |
| n-Pentane | 2.7 | 0.8 |
| Hexanes | 1.1 | 0.5 |
| Heptanes and heavier | 0.6 | |
| Carbon monoxide | 2.3 | 0.7 |
| Carbon dioxide | 6.0 | 1.8 |
| Average Molecular Weight of Gas | 30.2 | 24.1 |

Viscosity of Original Feed Stock and Visbroken Products (cs.)

| | 14° API Asphaltic Crude (Kern River) | | 29° API Waxy Crude (Wonsits) | |
|---|---|---|---|---|
| | Untreated Feed | Total Visbroken Product | Untreated Feed | Total Visbroken Product |
| Temperature, ° F.: | | | | |
| 140 | 270 | 39 | 18 | 9 |
| 120 | 600 | 68 | 28 | 12 |
| 100 | 1,500 | 132 | 50 | 19 |
| 80 | 4,600 | 300 | 300 | 70 |
| 70 | 8,500 | 465 | 500 | 120 |
| 60 | 18,000 | 800 | | |

[1] Thermal cracking likely to occur at temperatures higher than 900° F.
[2] The back pressure must be sufficient to keep the crude oil in the visbreaker heater coils in a liquid phase.
[3] A space velocity of about 1000 is required to prevent coke deposits. At a lower space velocity, coking may occur.

We claim as our invention:

1. A process for dehydrating a gas-oil-water mixture obtained from a production well wherein the oil includes constituents which solidify upon cooling, the process comprising the steps of:
reducing the vapor pressure of the gas-oil-water mixture by removing undissolved gas therefrom, thereby obtaining a mixture consisting of susbtantially oil and water;
separating the oil-water mixture into its oil and water components;
diverting a preselected portion of the separated oil;
heating the diverted preselected portion of oil to a temperature at which thermal degradation of at least some of the constituents of the oil takes place, thus lowering both the average molecular weight and the viscosity of the diverted oil;
blending the heated diverted oil with the water-oil mixture prior to separating the oil and water therefrom, thereby increasing the temperature and reducing the viscosity of the entire stream of separated oil; and
thereafter separating said blended mixture of diverted oil and oil and water prior to diverting said preselected portion.

2. The process of claim 1 including the step of, prior to blending the heated diverted oil with the oil-water mixture, adding preselected amounts of demulsifying agents to said oil-water mixture so as to convert the oil-water mixture into a form that resists emulsificaion.

3. The process of claim 1 including the step of controlling the temperature and flow of the diverted preselected portion of oil prior to the step of blending said diverted portion with said oil-water mixture.

4. The process of claim 3 including the step of controlling the temperature and flow of the blended oil-water mixture prior to separating said mixture.

5. The process of claim 6 including the step of controlling both the amount of oil separated from said oil-water mixture and the amount of oil diverted from the separated oil.

References Cited
UNITED STATES PATENTS

| | | | |
|---|---|---|---|
| 2,165,432 | 7/1939 | Whiteley | 208—106 |
| 2,758,665 | 8/1956 | Francis, | 55—175 |
| 2,773,556 | 12/1956 | Meyers et al. | 55—175 |
| 2,899,373 | 8/1959 | Steeves | 208—85 |
| 2,900,327 | 8/1959 | Beuther | 208—106 |
| 3,271,472 | 9/1966 | Ogle et al. | 208—106 |

REUBEN FRIEDMAN, Primary Examiner

C. N. HART, Assistant Examiner

U.S. Cl. X. R.

208—106